(12) United States Patent
Alder et al.

(10) Patent No.: US 8,713,725 B2
(45) Date of Patent: May 6, 2014

(54) WATER OUTLET FITTING

(75) Inventors: Hans-Ulrich Alder, Moosleerau (CH); Michael Lehner, Graenichen (CH); Heinz Graber, Oberkulm (CH)

(73) Assignee: KWC AG, Unterkulm (CH)

( * ) Notice: Subject to any disclaimer, the term of this patent is extended or adjusted under 35 U.S.C. 154(b) by 1383 days.

(21) Appl. No.: 12/007,453

(22) Filed: Jan. 10, 2008

(65) Prior Publication Data

US 2008/0196160 A1 Aug. 21, 2008

(30) Foreign Application Priority Data

Jan. 10, 2007 (EP) .................................... 07000432

(51) Int. Cl.
*E03C 1/04* (2006.01)

(52) U.S. Cl.
USPC .................................................. 4/678; 4/695

(58) Field of Classification Search
USPC ...................... 4/678, 695; 239/195, 196, 197; 137/355.12; 138/110, 131
See application file for complete search history.

(56) References Cited

U.S. PATENT DOCUMENTS

| | | | | |
|---|---|---|---|---|
| 1,790,500 A | * | 1/1931 | Fischer | 248/160 |
| 2,133,020 A | | 10/1938 | Fehrenbach | |
| 2,474,690 A | * | 6/1949 | Robinson et al. | 403/229 |
| 4,709,715 A | * | 12/1987 | Knight | 134/177 |
| 5,624,074 A | * | 4/1997 | Parisi | 239/588 |
| 5,749,179 A | | 5/1998 | Bohacik | |
| 7,162,782 B1 | * | 1/2007 | Nelson | 29/227 |
| 2003/0041372 A1 | * | 3/2003 | Yang | 4/605 |
| 2003/0146307 A1 | | 8/2003 | Herring | |

FOREIGN PATENT DOCUMENTS

| | | |
|---|---|---|
| DE | 10 2005 035 483 A1 | 2/2006 |
| EP | 0 296 470 A1 | 12/1988 |
| FR | 1 049 373 | 12/1953 |
| FR | 1593155 | * 11/1968 |
| FR | 1 593 155 | 5/1970 |

OTHER PUBLICATIONS

Translation of FR1593155.*

* cited by examiner

*Primary Examiner* — Gregory Huson
*Assistant Examiner* — Lauren Heitzer
(74) *Attorney, Agent, or Firm* — Oliff PLC

(57) ABSTRACT

The rinsing device comprises a flexible connecting pipe which at one end is connected to a connecting element which may be attached to a fitting and at the other end bears a spray head with an actuating lever. The spray head is held on a holder, which protrudes outwardly from the connecting element. The connecting pipe comprises a flexible water feed pipe which is surrounded by a casing element, which is formed by a single spiral tension spring consisting of one piece. Said spiral tension spring consists of a first upright spring portion having a straight spring axis, a second curved spring portion attached thereto and a third, similarly upright spring portion having a straight spring axis, which is attached to the second spring portion. A tube-shaped protective casing extends around the casing element which protects the casing element from soiling.

16 Claims, 6 Drawing Sheets

WATER OUTLET FITTING

Figure 1:
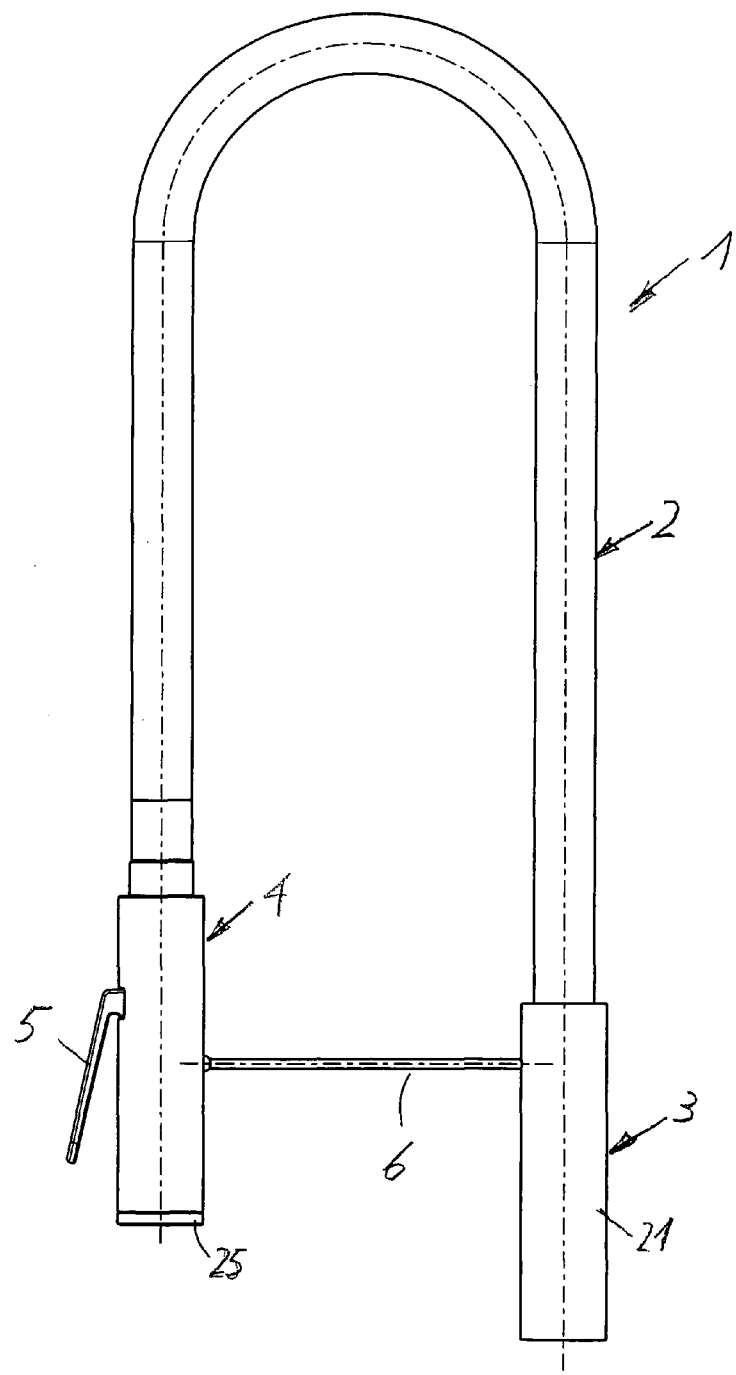

The present invention relates to a water outlet fitting according to the preamble of claim 1.

In the water outlet fitting disclosed in EP-A-0 296 470 a retractable hand-held spray, which in the resting state is held in a guide arranged on a wash basin, is connected to the outlet of a mixer fitting via a pipe. A tension spring configured as a compression spring is pulled over the pipe which is supported at one end on a connecting point of the mixer fitting and at the other end on the guide for the hand-held spray. When the hand-held spray is inserted into the guide, the compression spring extends with the pipe in a loop. If the hand-held spray is pulled out of its guide, said loop is shortened and the compression spring accordingly further compressed. If the hand-held spray is returned back into the guide, the compression spring again relaxes to form a larger loop and thus pulls back the pipe. The compression spring surrounding the pipe thus ensures the correct return of the pipe when replacing the hand-held spray into the guide.

A generic water outlet fitting is disclosed in DE-A-10 2005 035 483, in which a deformable water pipe is arranged between a mixer unit and a spray head. Said water pipe has a water feed pipe which is surrounded by a bendable casing element. The casing element comprises two helical parts, namely an inner coil and an outer coil, which is wound about the inner coil. At least one of said coils is configured as a tension spring acting in tension, which is held in pretension by the winding together of the coils. As a result, a displacement of the coils relative to one another is restricted due to static friction and the casing element maintains its shape which has been achieved by bending. With such an embodiment of the casing element it is achieved that the water pipe may adopt different bent positions and that it remains in the respective bent position.

The object of the present invention is, therefore, to provide a water outlet fitting of the aforementioned type, in which after moving out of a resting position the spray head is automatically able to return to this resting position and adopts a stable position therein.

This object is achieved according to the invention by a water outlet fitting with the features of claim 1.

As a result of the curved spring portion which acts on its outer face in the manner of a compression spring, the casing element surrounding the water feed pipe has a great flexibility and allows the spray head a great freedom of movement. Together with the two spring portions having a straight spring axis, the curved spring portion of the casing part ensures that the spray head automatically returns into its resting position, in which under the action of all spring portions, the spray head adopts a stable position.

Preferred developments of the water outlet fitting according to the invention form the subject matter of the dependent claims.

Figure 2:
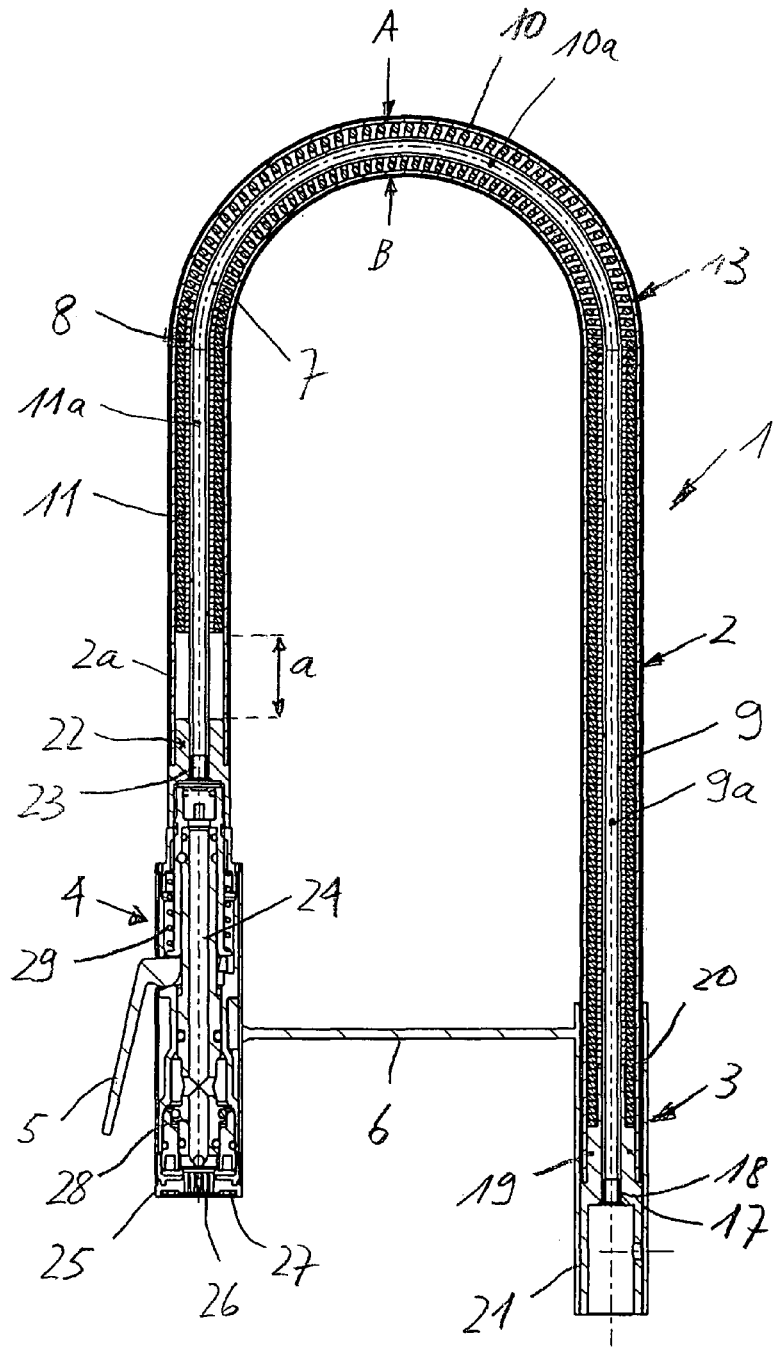
Figure 3:
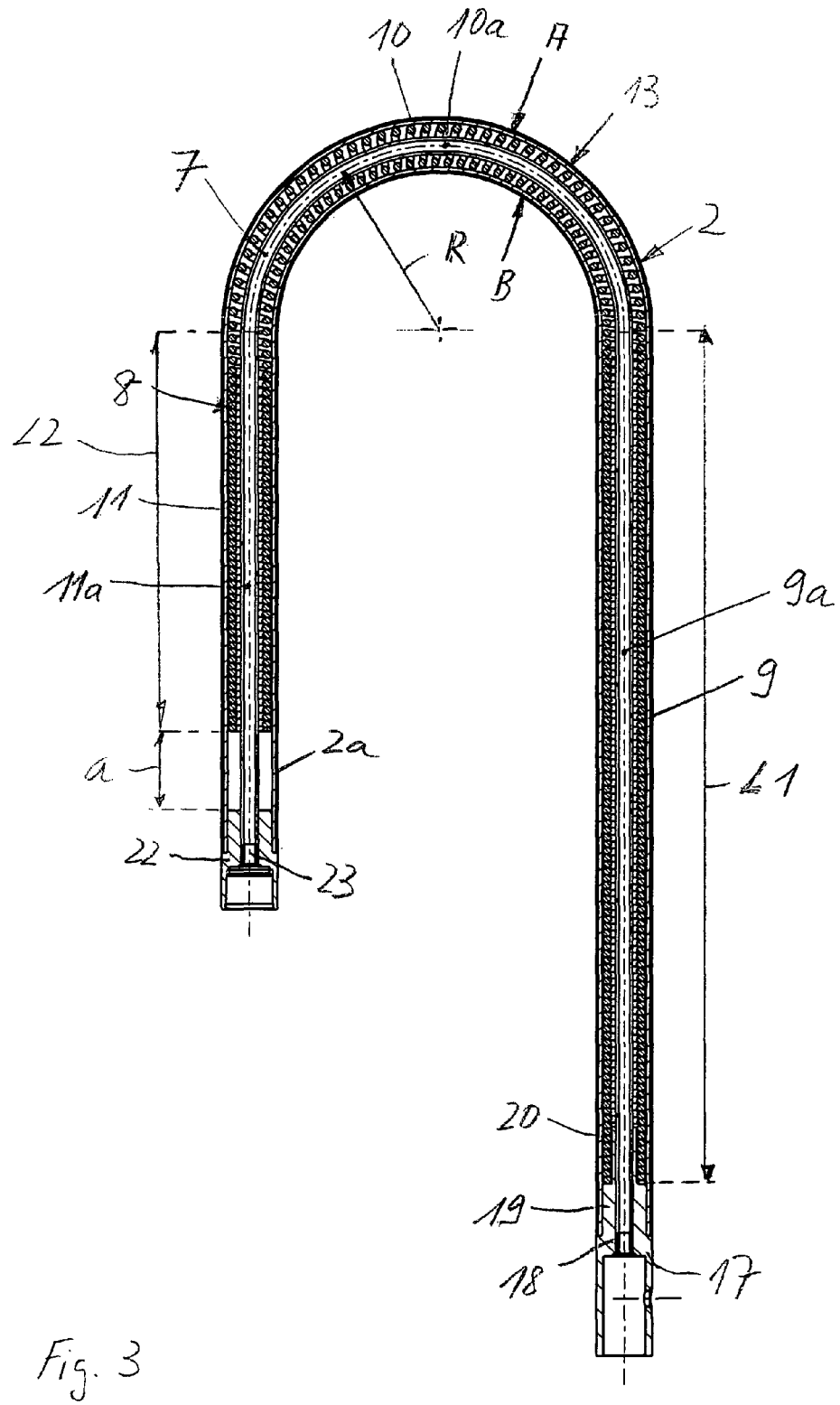
Figure 4:
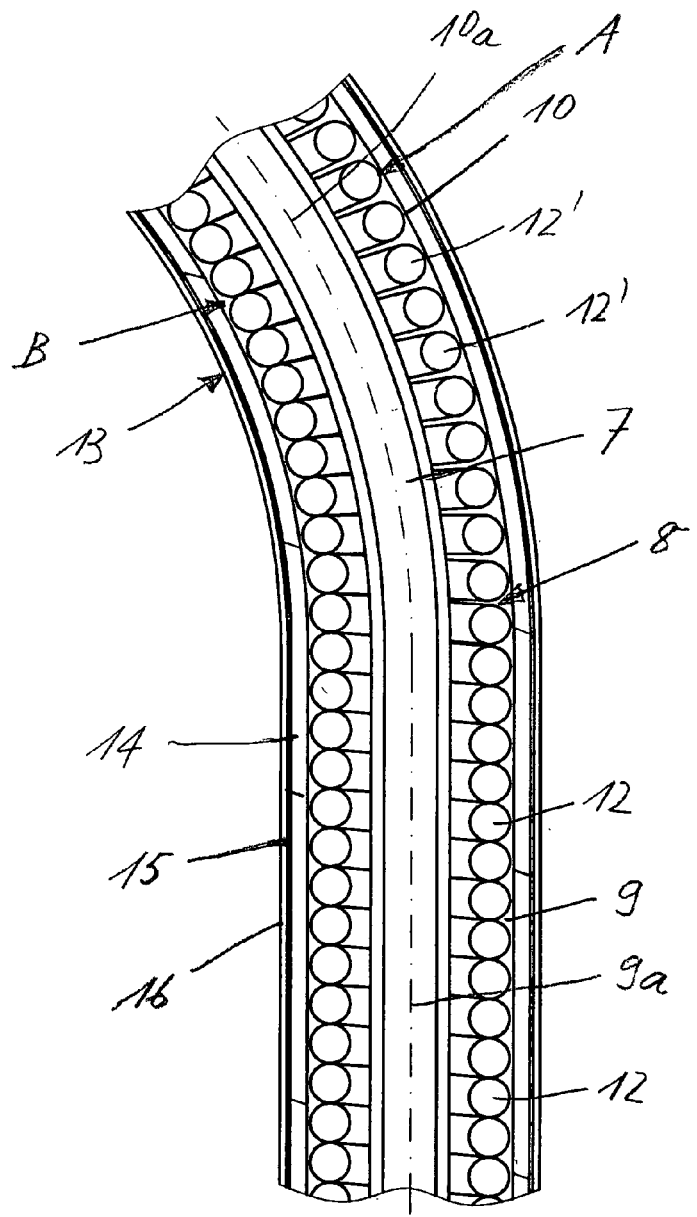
Figure 5:
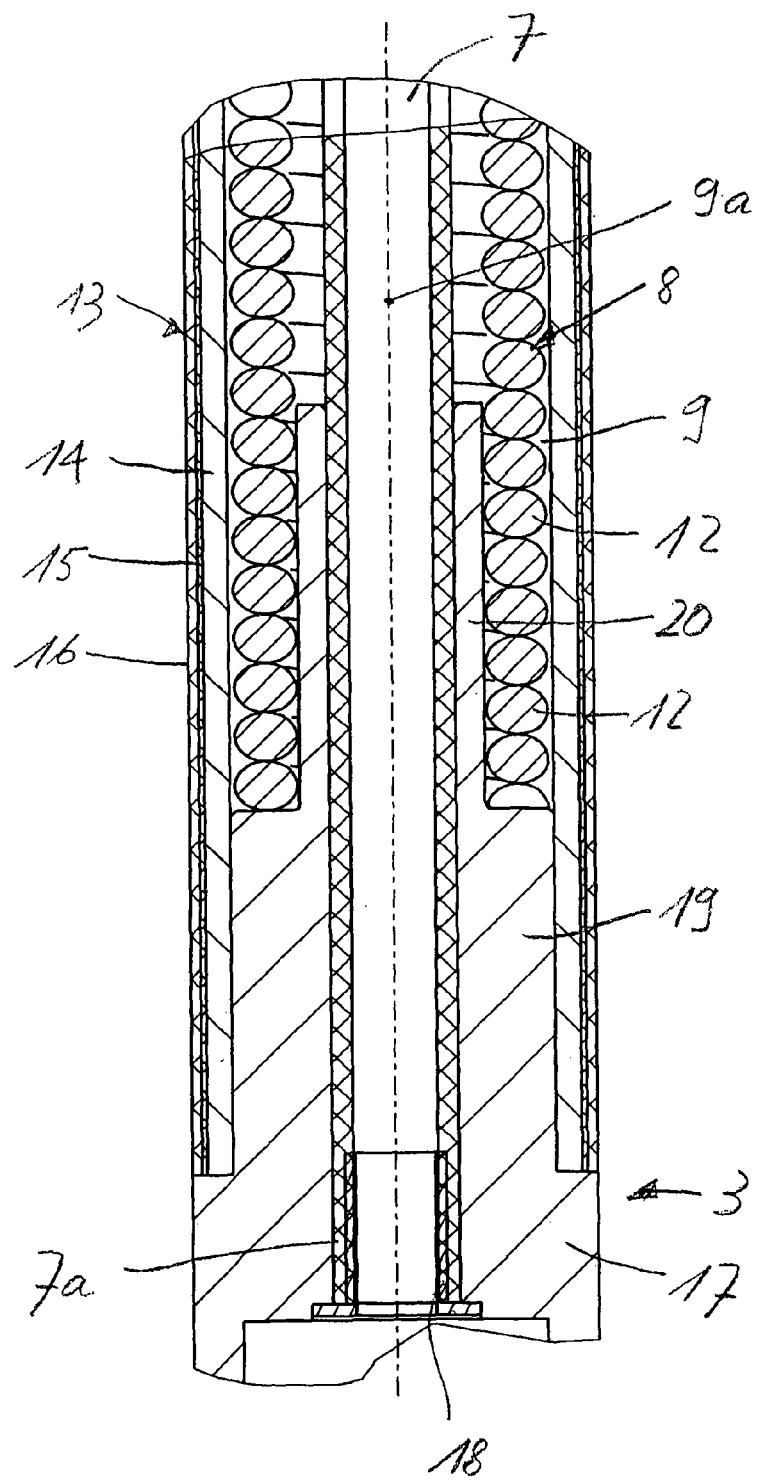
Figure 6:
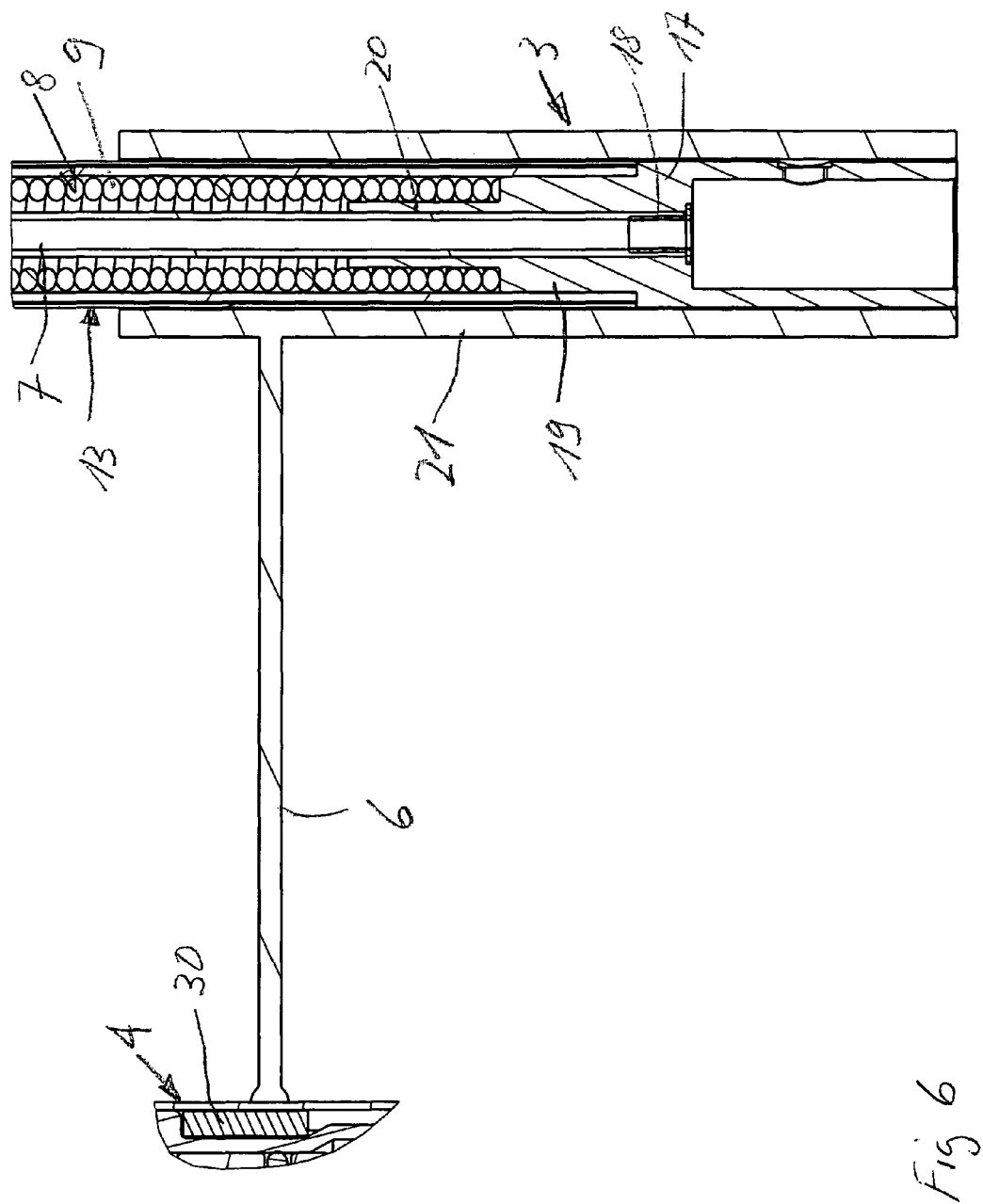

Embodiments of the subject of the invention are described hereinafter in more detail with reference to the drawings, in which purely schematically:

FIG. 1 shows a rinsing device in side view;

FIG. 2 shows the rinsing device according to FIG. 1 in longitudinal section, FIG. 3 shows the connecting pipe of the rinsing device according to FIG. 1 in longitudinal section, FIG. 4 shows in an enlarged scale relative to FIG. 3 and in longitudinal section a portion of the connecting pipe shown in FIG. 3, FIG. 5 shows in an enlarged scale relative to FIG. 3 and in longitudinal section the one end region of the connecting pipe shown in FIG. 3, and FIG. 6 shows in an enlarged scale relative to FIG. 2 and in longitudinal section the lower part of the rinsing device shown in FIG. 2.

A rinsing device 1 is shown in its resting position in FIGS. 1 and 2 in side view and/or in section. Said rinsing device 1 comprises a flexible connecting pipe 2 which at one end is connected to a connecting element 3 and at the other end bears a spray head 4 with an actuating lever 5. The spray head 4 is held in the shown resting position on a holder 6 which protrudes outwardly from the connecting element 3. The connecting element 3 is attached to a fitting, not shown. As FIGS. 2 and 3 show, in particular, the connecting pipe 2 comprises a flexible water feed pipe 7 which is surrounded by a casing element 8. The casing element 8 is formed by a tension spring which is designed as a helical spring. The construction of said casing element 8 is now explained with reference to FIGS. 2-5.

The casing element 8, i.e. the single coil tension spring consisting of one piece and preferably wound with pretension, consists of a first upright spring portion 9, having a straight spring axis 9*a*, a second curved spring portion 10 having a curved spring axis 10*a* attached thereto and a third, similarly upright spring portion 11 having a similarly straight spring axis 11*a*, which is attached to the second spring portion 10. In the resting state shown in the figures, in the two spring portions 9 and 11 the windings 12 of the tension spring preferably bear against one another under pretension, whilst in the curved spring portion 10 the windings 12' extend at a mutual distance from one another on the outer face A thereof, and only bear against one another on the inner face B thereof, preferably under pretension (see in particular FIGS. 4 and 5). On its outer face A the second curved spring portion 10 acts in the manner of a compression spring, whilst said second spring portion 10 exhibits a tension spring effect on its inner face B.

A tube-shaped protective casing 13 extends around the casing element 8 which is of the known construction. As FIGS. 4 and 5 show, said protective casing 13 has an element 14 made of steel surrounding the casing element 8, which in turn is surrounded by braid 15 which preferably consists of fiber glass. An external casing 16 made of plastics extends around the braid 15. The protective casing 13 protects the casing element 8 from soiling.

As FIGS. 2, 3, 5 and 6 show, the connecting element 3 comprises a connecting piece 17 through which the water feed pipe 7 passes. The end 7*a* of the water feed pipe 7 on the inlet side is anchored by means of a clamping piece 18 in the connecting piece 17. As FIG. 5 shows, the end 7*a* of the water feed pipe 7 on the inlet side is clamped between the clamping piece 18 and the connecting piece 17. The connecting piece 17 comprises a retaining part 19 with a smaller diameter over which the end of the tube-shaped protective casing 13 is pulled (FIG. 5). In this manner, the protective casing 13 is connected to the connecting piece 17. Said connecting piece 17 further comprises a tubular support element 20 which has a smaller diameter than the retaining part 19 and is attached thereto. The tubular support element 20 is surrounded by the end of the casing element 8, i.e. by the end of the first spring portion 9 and ensures the support of said end of the first spring portion 9. In this manner, the tension spring on the connecting element 3 is prevented from kinking.

As FIGS. 1, 2 and 6 show, the connecting element 3 has an outer sleeve 21 which surrounds the connecting piece 17. The outwardly protruding holder 6 for the spray head 4 is fastened to said connecting sleeve 21.

At the end of the connecting pipe 2 on the outlet side said connecting pipe comprises a connecting part 22 which corresponds to the connecting piece 17. The water feed pipe 7 is anchored in the connecting part 22, in a similar manner as on the inlet side, by means of a clamping piece 23. The tube-shaped protective casing 13 is also pulled over the connecting part 22 in a similar manner as on the inlet side, as FIGS. 2 and 3 show. The casing element 8, i.e. the tension spring, terminates, in the embodiment shown, at a distance a in front of the connecting part 22. This means that in the corresponding portion 2a of the connecting pipe 2 the water feed pipe 7 is not surrounded by the casing element 8. Thus the connecting pipe 2 in this portion 2a is more flexible than over the remainder of its length. In a further embodiment, not shown, however, the casing element, i.e. the third spring portion 11, may be guided as far as the connecting part 22. In this case, the fastening of the end of the third spring portion 11 takes place in the same manner as the disclosed fastening of the end of the first spring portion 9 to the connecting piece 17.

The spray head 4 is fastened to the connecting part 22 (FIG. 2). As FIG. 2 further shows, the spray head 4 is provided with a flow channel 24 and carries an outlet nozzle 25. Said outlet nozzle 25 comprises an internal, central nozzle part 26 and an annular outer nozzle part 27 which surrounds the internal nozzle part 26. Inside the spray part 4 a valve piston 28 is displaceably guided, which by means of a closing spring 29 is held in its closed position, in which it closes the nozzles of the nozzle parts 26, 27.

The valve piston 28 may be displaced by means of the actuating lever 5 from its closed position into two open positions. If the actuating lever 5 is moved into a first position in the direction toward the spray part 4, the valve piston 28 is moved counter to the force of the closing spring 29 into a first open position, in which it releases both the nozzles of the internal nozzle part 26 and the nozzles of the outer nozzle part 27. If the actuating lever 5 is pivoted again out of said first position into a second position, the valve piston 28 is moved into a second open position, in which the water flow to the nozzles of the outer nozzle part 27 is prevented. This means that the water may only flow out through the nozzles of the inner nozzle part 26. The water stream emerging from the internal nozzle part 26 is more powerful, therefore, as the water outlet from the nozzles of the outer nozzle part 27 is blocked.

In order to secure the spray head 4 in its resting position, in the inside of the spray head 4 a magnetic element 30 is arranged, which cooperates with the metallic holder 6 (FIG. 6).

For use, the spray head 4 is pulled away by hand from the holder 6 and due to the second curved spring portion 10 may be moved within a large range without a great exertion of force. For increasing the operating range of the spray head 4, it is possible to pull with increased force on the spray head 4, so that the two other spring portions 9 and 11 are also deformed.

If the spray head 4 is released again, it automatically returns into the resting position under the action of the first and third tension spring portion 9 and 11 and with the assistance of the second curved spring portion 10. In said resting position, the rinsing device 1 adopts a stable position due to the spring portions 9 and 11.

In a preferred embodiment, in which the weight of the spray head 4 is approximately 300 grams, the tension spring forming the casing element 8 consists of a wire made of stainless spring steel with a diameter of 3 mm. The external diameter of the tension spring is 15 mm. With a total length of the tension spring of approximately 650 mm, the length L1 of the first spring portion 9 is approximately 300 mm, and the length L2 of the third spring portion 11 is approximately 114 mm (see FIG. 2). The radius R of the curve, along which the spring axis 10a of the second spring portion 10 extends, is in this case 65 mm.

The subject of the invention has been explained above with reference to a rinsing device as is used in kitchens. It is understood that the water outlet fitting is also suitable for other purposes, for example for a shower spray.

In the embodiment shown in FIGS. 1-6, the two spring portions 9 and 11 extend in the vertical direction. It is, however, also conceivable that both these spring portions 9, 11 or only one thereof extends in a different direction, such as for example in the horizontal direction.

Moreover, it is also conceivable in the water outlet fitting according to the invention to insert a tension spring which, apart from the two spring portions 9, 11 having a straight spring axis 9a, 11a which are connected to one another via the curved spring portion 10, has further spring portions having a straight spring axis, which are respectively connected by a curved spring portion to the next spring portion having a straight spring axis. In such an embodiment, the tension spring has a meandering shape at least over part of its length.

The invention claimed is:

1. A water outlet fitting comprising a flexible water feed pipe which at one end may be connected to a water supply and at the other end is connected to a spray head, and with a bendable, deformable casing element surrounding the water feed pipe, wherein
   the casing element is surrounded by a flexible tube-shaped protective casing; and
   the casing element is formed by a helical spring which comprises at least first and second spring portions each having a straight spring axis in which in a resting state windings bear against one another under pretension, and a curved third spring portion arranged between said first and second spring portions having a curved spring axis in which the windings on an inner face thereof bear against one another, and on an outer face thereof are arranged at a mutual distance from one another, such that, when the spray head has been deflected relative to one of the straight spring axes, the curved spring portion, together with the two spring portions having, in the resting state, the straight spring axis, ensures that the spray head automatically returns into a resting position, in which under the action of all spring portions, the spray head adopts a stable position.

2. The water outlet fitting as claimed in claim 1, wherein at each end of the helical spring a spring portion having a straight spring axis is provided.

3. The water outlet fitting as claimed in claim 1, wherein an end of the first spring portion on an inlet side having a straight spring axis is supported by means of a tubular support element engaging in an inside of said first spring portion, which is preferably part of a connecting piece which may be connected to a fitting.

4. The water outlet fitting as claimed in claim 1, wherein an end of the water feed pipe on an inlet side is fixedly clamped between a tubular clamping piece engaging in an inside of the water feed pipe and a connecting piece surrounding the water feed pipe and which may be attached to a fitting.

5. The water outlet fitting as claimed in claim 1, wherein an end of the water feed pipe on an outlet side is fixedly clamped between a tubular clamping piece engaging inside the water feed pipe and a connecting part surrounding the water feed pipe attached to the spray head.

6. The water outlet fitting as claimed in claim 1, wherein the protective casing on an end on an outlet side is connected to a connecting part which is attached to a nozzle part.

7. The water outlet fitting as claimed in claim 6, wherein an end of the casing element on the outlet side terminates at a distance from the connecting part.

8. The water outlet fitting as claimed in claim 6, wherein an end of the second spring portion on the outlet side having a straight spring axis is supported by means of a tubular support element engaging in an inside of said second spring portion, which is part of the connecting part.

9. The water outlet fitting as claimed in claim 1, wherein in the resting state, the first spring portion having a straight spring axis is upright.

10. The water outlet fitting as claimed in claim 9, wherein in the resting state, the second spring portion having a straight spring axis extends approximately parallel to the first spring portion having a straight spring axis.

11. The water outlet fitting as claimed in claim 1, further comprising:

a holder for fixing the spray head in its resting position, on which the spray head is releasably held by means of magnetic force.

12. The water outlet fitting as claimed in claim 1, wherein the helical spring forming the casing element has a plurality of spring portions having a straight spring axis, which are respectively connected to one another via a curved spring portion.

13. The water outlet fitting as claimed in claim 1, wherein the water outlet fitting is a rinsing fitting.

14. The water outlet fitting as claimed in claim 1, wherein the water outlet fitting is a shower spray fitting.

15. The water outlet fitting as claimed in claim 1, wherein the windings on the inner face of the curved third spring portion bear against one another under pretension.

16. The water outlet fitting as claimed in claim 1, wherein the spray head is fixedly mounted in a fixed distance relative to the casing element.

* * * * *